US011237093B2

(12) United States Patent
Xiong et al.

(10) Patent No.: US 11,237,093 B2
(45) Date of Patent: Feb. 1, 2022

(54) EXTERNAL FLUIDICS SYSTEM FOR FLOW CYTOMETER

(71) Applicant: Bio-Rad Laboratories, Inc., Hercules, CA (US)

(72) Inventors: Fan Xiong, Hercules, CA (US); Edward Marquette, Hercules, CA (US); Brian D. Hall, Hercules, CA (US); Michelle Scott, Hercules, CA (US); Matthew Alexander, Hercules, CA (US)

(73) Assignee: BIO-RAD LABORATORIES, INC., Hercules, CA (US)

( * ) Notice: Subject to any disclaimer, the term of this patent is extended or adjusted under 35 U.S.C. 154(b) by 0 days.

(21) Appl. No.: 16/214,674

(22) Filed: Dec. 10, 2018

(65) Prior Publication Data

US 2020/0182771 A1    Jun. 11, 2020

(51) Int. Cl.
*G01N 15/14* (2006.01)
(52) U.S. Cl.
CPC . *G01N 15/1404* (2013.01); *G01N 2015/1409* (2013.01)
(58) Field of Classification Search
CPC .. G01N 21/211; G01N 21/47; G01N 21/9501; G01N 21/636; G01N 2021/646; G01N 2021/8825; G01N 21/956; G01N 21/64; G01N 21/94; G01N 21/55; G01N 21/9503; G01N 2021/213; G01N 21/27; G01N 2021/214; G01N 21/4788; G01N 23/223; G01N 23/20075; G01N 23/201; G01N 21/95607; G01N 23/085;
(Continued)

(56) References Cited

U.S. PATENT DOCUMENTS 3,441,136 A * 4/1969 Wilson, Jr. .............. A61M 1/16
    210/90
4,069,838 A * 1/1978 Hansel ................ G01F 23/2921
    137/392
(Continued)

FOREIGN PATENT DOCUMENTS

CN    201817887 U  *  5/2011
CN    202882915 U  *  4/2013
(Continued)

OTHER PUBLICATIONS

International Search Report and Written Opinion, International Application No. PCT/US2019/064923, PCT/ISA/210, PCT/ISA/220. PCT/ISA/237, dated Feb. 24, 2020.

*Primary Examiner* — Michael P Stafira
(74) *Attorney, Agent, or Firm* — Saliwanchik, Lloyd & Eisenschenk

(57) ABSTRACT

An external fluidic system and methods of operating the same are provided. The fluidic system can be hot-swap connected to a flow-cytometer-based system at runtime to expand sheath or waste fluid storage capability of the flow-cytometer-based system by making only minimal changes to the flow-cytometer-based system. The external fluidic system can include a pump and a controller configured to operate the external fluidic system such that the sheath fluid is supplied from the external fluidic system to the flow-cytometer-based system or the waste fluid is extracted from the flow-cytometer-teased system and provided to the external fluidic system.

20 Claims, 7 Drawing Sheets

(58) Field of Classification Search
CPC ......... G01N 23/2076; G01N 2021/217; G01N
2021/4707; G01N 2021/4711; G01N
2021/4792; G01N 2021/8438; G01N
23/207; G01N 2021/95676; G01N
21/8806; G01N 2201/0697; G01N
2223/04; G01N 2223/045; G01N
2223/0568; G01N 2223/076; G01N
2223/1016; G01N 2223/501; G01N
23/041; G01N 23/046; G01N 23/087;
G01N 23/2204; G01N 23/2209; G01N
2015/149; G01N 15/1404; G01N
15/1459; G01N 2015/1409; G01N 15/14;
G01N 2015/1006; G01N 27/745; G01N
33/54326; G01N 21/6428; G01N 21/645;
G01N 2021/6439; G01N 21/53; G01N
2015/1486; G01N 21/6458; G01N
33/574; G01N 15/00; G01N 2001/4016;
G01N 2021/653; G01N 33/491; G01N
33/57434; G01N 33/57492; G01N
15/1434; G01N 15/1463; G01N 15/147;
G01N 1/4077; G01N 2015/1413; G01N
2035/00554; G01N 21/65; G01N
33/54333; G01N 35/0098; G01N
15/1012; G01N 15/1425; G01N 15/1436;
G01N 2021/0346; G01N 21/05; G01N
35/1002; G01N 2015/008; G01N
2015/1411; G01N 2015/144; G01N
2015/1447; G01N 2015/1452; G01N
33/5005; G01N 35/109; G01N 35/1095;
G01N 15/1056; G01N 15/1475; G01N
15/1484; G01N 2001/383; G01N
2015/1018; G01N 2015/1025; G01N
2015/1068; G01N 2015/1075; G01N
2015/1081; G01N 2015/1418; G01N
2015/142; G01N 2015/1443; G01N
2015/1465; G01N 2015/1472; G01N
2015/1477; G01N 2015/1497; G01N
2035/00465; G01N 21/453; G01N
21/6452; G01N 21/6454; G01N 2500/00;
G01N 33/5008; G01N 33/5011; G01N
33/502; G01N 33/5076; G01N 33/5302;
G01N 33/5432; G01N 33/545; G01N
35/00; G01N 35/08; G01N 35/1004;
G01N 35/1009; G01N 35/1097; G01N
15/06; G01N 15/12; G01N 15/1209;
G01N 15/1427; G01N 1/14; G01N
2001/1427; G01N 2015/045; G01N
2015/1062; G01N 2015/1087; G01N
2021/6417; G01N 2021/6469; G01N
2021/655; G01N 2030/0035; G01N
2030/0065; G01N 2030/007; G01N
2030/326; G01N 2030/383; G01N
2035/00574; G01N 2035/009; G01N
2035/0091; G01N 21/1702; G01N 21/49;
G01N 21/6402; G01N 2223/637; G01N
2291/02466; G01N 2291/048; G01N
2800/56; G01N 29/032; G01N 29/222;
G01N 30/0005; G01N 30/6095; G01N
33/493; G01N 33/5094; G01N 33/533;
G01N 33/54346; G01N 33/57449; G01N
33/582; G01N 33/587; G01N 35/00722;
G01N 35/10; G01N 35/1011; G01N
35/1016; G03F 7/70625; G03F 7/70633;
G03F 7/7065; G03F 7/70616; G03F
7/707; G03F 7/70708; G03F 7/70658;
G03F 7/70058; G03F 7/70141; G01J
3/02; G01J 3/0229; G01J 2003/283; G01J
2003/2866; G01J 3/0218; G01J 3/0224;
G01J 3/0262; G01J 3/0291; G01J 3/1838;
G01J 3/28; G01J 3/2823; G01J 3/46;
G01J 3/462; G01J 3/463; G01J 3/465;
G01J 3/505; G01J 3/51; G01J 3/524;
G01J 3/0208; G01J 3/44; G01J 3/4412;
G02B 26/08; G02B 26/0816; G02B
26/0875; G02B 26/0883; G02B 27/0025;
G02B 27/0075; G02B 27/09; G02B
21/0076; G02B 21/0032; G02B 21/0084;
G02B 27/0012; G02B 21/16; G02B 5/04
See application file for complete search history.

(56) References Cited

U.S. PATENT DOCUMENTS

| | | | | |
|---|---|---|---|---|
| 4,590,793 | A * | 5/1986 | Staats, Jr. | G01M 3/26 73/40 |
| 6,040,776 | A * | 3/2000 | Glover | G01F 23/0007 137/557 |
| 6,058,954 | A * | 5/2000 | Glover | G03D 3/06 137/1 |
| 6,302,147 | B1 * | 10/2001 | Rose | F16L 37/56 137/614.03 |
| 7,981,661 | B2 * | 7/2011 | Rich | G01N 15/1404 422/67 |
| 2004/0031521 | A1 * | 2/2004 | Vrane | F04B 11/0025 137/207 |
| 2007/0215528 | A1 * | 9/2007 | Hayenga | B01L 3/502761 209/576 |
| 2007/0243106 | A1 * | 10/2007 | Rich | G01N 15/1404 422/73 |
| 2009/0293910 | A1 * | 12/2009 | Ball | G01N 15/1404 134/6 |
| 2011/0008816 | A1 * | 1/2011 | Ball | G01N 33/56972 435/29 |
| 2011/0203686 | A1 * | 8/2011 | Carson-Rowland | G01F 23/242 137/558 |
| 2013/0091937 | A1 | 4/2013 | Rich | |
| 2013/0333765 | A1 * | 12/2013 | Fox | G01N 1/286 137/2 |
| 2014/0158212 | A1 | 6/2014 | Vrane et al. | |
| 2015/0115174 | A1 * | 4/2015 | Chen | G01N 15/1459 250/458.1 |
| 2016/0377524 | A1 * | 12/2016 | Martin | G01N 35/1097 73/864.81 |
| 2017/0191922 | A1 * | 7/2017 | Ward | F04C 2/08 |
| 2018/0003324 | A1 * | 1/2018 | Dinh | F16L 37/34 |
| 2018/0156710 | A1 * | 6/2018 | Vrane | G01N 15/1404 |
| 2018/0313742 | A1 | 11/2018 | Fox et al. | |
| 2020/0132587 | A1 * | 4/2020 | Barnes | G01N 35/10 |

FOREIGN PATENT DOCUMENTS

| | | | |
|---|---|---|---|
| CN | 108535503 A * | 9/2018 | |
| WO | WO-9900154 A1 * | 1/1999 | A61L 11/00 |

* cited by examiner

Prior Art

EXTERNAL FLUIDICS SYSTEM FOR FLOW CYTOMETER

BACKGROUND

Flow cytometers are useful for analyzing sample fluids having cells or particles and identifying characteristics of the cells or particles contained within a fluid. These cells or particles may be biological or physical samples that are collected for analysis and/or separation. The sample is mixed with a sheath fluid for transporting the cells or particles through the flow cytometer. The particles may comprise biological cells, calibration beads, physical sample particles, or other particles of interest.

FIG. 1 shows a schematic view of a typical flow cytometer. Referring to FIG. 1, the fluid is typically passed through a flow chamber, such as a small nozzle, generating a narrow fluid stream. A light beam, such as a laser beam, illuminates the cells and particles and the like in the sample stream as they pass. Light detectors and color detectors 1 and 2 are positioned to detect scatter light and fluorescence light. This information is collected by a computer and then used by the flow cytometer to identify the particles or characteristics of the particles in the fluid. FIG. 2 shows a hydrodynamic focusing process of the flow chamber of the flow cytometer. When sheath fluid passes through the hydrodynamic focusing regions of the flow chamber, a single file of particles is produced in the flow cytometer system for analysis and characterization. The sheath fluid is often buffered saline or de-ionized (DI) water, but the sheath fluid may alternatively be any suitable fluid to hydrodynamically focus the sample fluid.

As flow cytometer systems become smaller and more portable, the sheath fluid containers and the waste fluid containers are becoming correspondingly smaller and more portable. As a result, portable flow cytometer systems may exhaust the supply of sheath fluid or overfill the waste container during the course of an experiment. While refilling or replacing the sheath fluid container and emptying the waste container takes a nominal amount of time and effort, the user must continuously suspend the experiment to ensure that the sheath fluid is not entirely depleted and that the waste container is not overfilled. Should the sheath container become empty, data sampled from or around the time when the sheath fluid ran out may be compromised. Accordingly, a user will typically have to provide a new sample material and run new experiments to ensure the accuracy of the data. Similarly, should the waste container overflow, the user will undoubtedly have to suspend the experiment in order to clean and sterilize the area. As the samples analyzed by flow cytometers vary from relatively benign to much less so, the overflow of the waste container can cause serious delays and perhaps hazardous conditions.

BRIEF SUMMARY

In view of the problems in the related art, there is a need for an improved flow cytometer system that is adapted to determine a volume of the sheath fluid or the waste fluid during operations and can expand the storage capacity of the sheath fluid or the waste fluid without causing any interruptions to the normal operations of a running flow cytometer system.

Embodiments of the subject invention provide systems and methods for connecting an external fluidic system to an existing flow-cytometer-based system (for example, as a hot-swap option) to expand the storage capability of the flow-cytometer-based system by making only minimal changes to the flow-cytometer-based system.

In an embodiment, a fluidic system can comprise: a container; a tubing configured to be capable of being connected to a flow-cytometer-based system; a second pump; a measurement device; and a controller in operable communication with the second pump and the measurement device. The controller of the fluidic system can be configured to operate the fluidic system to supply fluid to or extract fluid from the flow-cytometer-based system. The flow of sheath fluid or waste fluid can be automatically switched between the fluidic system and an internal waste fluidic system of the flow-cytometer-based system without causing any interruption to the normal operations of the running flow-cytometer-based system.

In another embodiment, a method for using a fluidic system is provided. The fluidic system can comprise a tubing connecting the fluidic system to the flow-cytometer-based system that has a first pump, a measurement device, a second pump, and a controller in operable communication with the second pump and the measurement device. The container contains a first fluid that is a sheath fluid flowing to the flow-cytometer-based system or a waste fluid flowing from the flow-cytometer-based system. The method comprises: operating, by the controller, the fluidic system to supply the first fluid from the container to the flow-cytometer-based system, when the first fluid is the sheath fluid, and to extract the first fluid from the flow-cytometer-based system and provide it to the container, when the first fluid is the waste fluid.

In another embodiment, a system for cell/particle characterization or separation can comprise: a flow cytometer comprising a first pump; and a fluidic system in operable communication with the flow cytometer. The fluidic system can comprise: a container; a tubing connected to the flow cytometer, a second pump; a measurement device; and a controller in operable communication with the second pump and the measurement device, wherein the controller is configured to operate the fluidic system based on a condition of the flow cytometer.

In some embodiments, the measurement device measures a property of the sheath fluid or waste fluid in the container and transmits the measurement result to the controller. The controller determines whether the measurement result received is greater than or equal to a predetermined threshold value and adjusts an operation condition of the second pump to direct the fluid flow directions according to results of the determination.

In certain embodiments, the fluidic system performs its functionalities independent from any signal communications with the flow-cytometer-based system. In alternative embodiments, the fluidic system performs its functionalities based on signal communications with the flow-cytometer-based system.

DETAILED DESCRIPTION

Embodiments of the subject invention relate to advantageous external fluidic systems, methods of operating the same, and methods of using the same. An external fluidic system can be easily connected to an existing flow cytometer system to expand the fluid storage capability of the existing flow cytometer system by making only minimal changes to the existing flow cytometer system.

Figure 1:
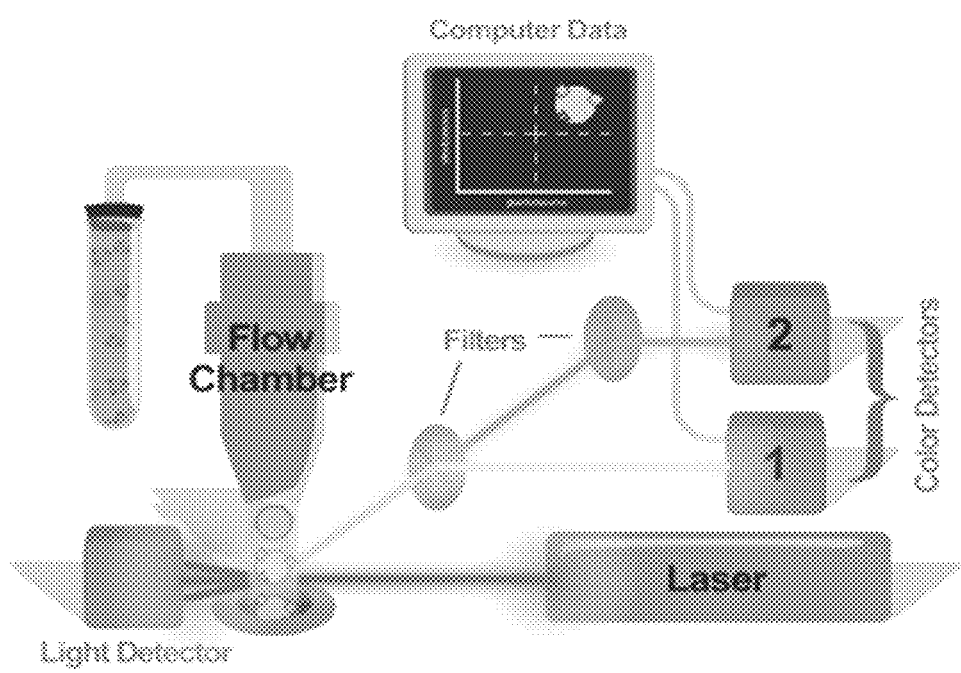
FIG. 1 is a schematic representation of a prior art flow cytometer system.
Figure 2:
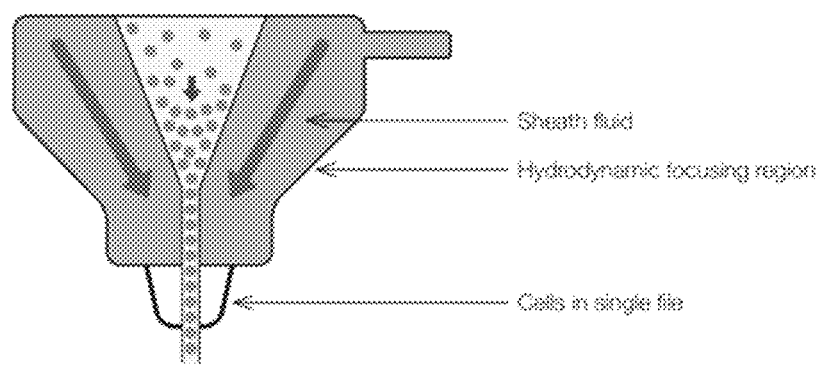
FIG. 2 is a schematic representation of a hydrodynamic focusing process that produces a single stream of cells/particles in a prior art flow cytometer system.
Figure 3:
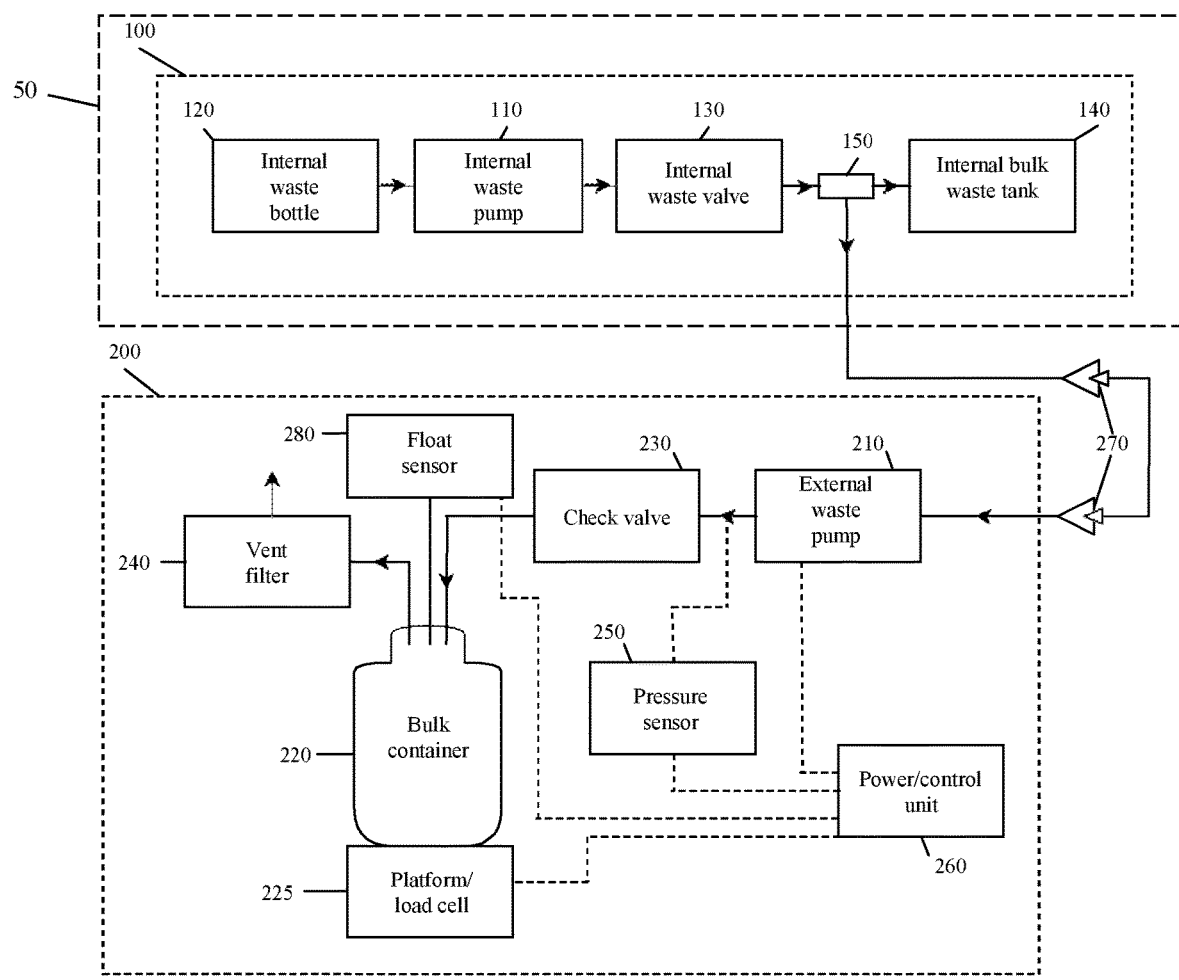
FIG. 3 is a schematic view of an external waste fluidic system connected to an internal waste fluidic system of a flow-cytometer-based system according to an embodiment of the subject invention.

In some embodiments, an external fluidic system can be configured to, and/or used for, extracting waste fluid. Referring to FIG. 3, an external waste fluidic system 200 for waste extraction can include: an external waste pump 210 extracting the waste fluid from an (optional internal waste fluidic system 100 of the existing flow-cytometer-based system 50, and pumping the extracted waste fluid into a bulk container 220 connected to the external waste pump 210 via an optional valve 230; a pressure sensor 250 coupled to the connecting tubing between the external waste pump 210 and the valve 230 to sense a pressure of the bulk container 220; a platform/load cell 225 coupled to the bulk container 220 for measuring a primary parameter such as a volume of the fluid contained by the bulk container 220; a float sensor 280 coupled to the bulk container 220 for measuring a secondary parameter such as a level of the fluid contained by the bulk container 220; and a power/control unit 260 coupled to the external waste pump 210, the pressure sensor 250, the float sensor 280, and the platform/load cell 225 to implement control functionalities of the external waste fluidic system 200. The external waste fluidic system 200 may include a vent filter 240 connected to the bulk container 220 to filter the vent of the bulk container 220 and a power source (not shown) connected to the external waste fluidic system 200 to supply power to the external waste fluidic system 200. The external waste fluidic system 200 can include connection tubing and/or a coupler such as a dry break connector 270 to be connected to the existing flow-cytometer-based system 50, but may be alternatively connected to any suitable system.

The existing flow-cytometer-based system 50 that the external waste fluidic system 200 is capable of connecting to may include an internal waste fluidic system 100. The internal waste fluidic system 100, if present, can include an internal waste evacuation pump 110 to extract the waste fluid from the internal waste bottle 120 that contains the waste fluid generated by the operations of the flow-cytometer-based system 50, and to pump the extracted waste fluid into an internal bulk waste tank 140. An internal waste valve 130 (e.g., a waste valve that can control which internal waste tank the waste is directed to, such as the ½ valve in the Bio-Rad ZE5 system) and an internal waste three-way connector 150 are disposed between the internal waste evacuation pump 110 and the internal bulk waste tank 140.

The external waste fluidic system 200 may be connected to the internal waste fluidic system 100 through the internal waste three-way connector 150.

The bulk container 220 may be used to contain the waste fluid generated by the flow-cytometer-based system and works as an extra storage in additional to the internal bulk waste tank 140 of the internal waste fluidic system 100, thereby enlarging the capacity of the flow-cytometer-based system for storage of the waste fluid when connecting the external waste fluidic system 200 to the flow-cytometer-based system. The hulk container 220 can be, for example, a vented tank with a volume of approximately 20 L, and the bulk container 220 may alternatively be any suitable container of any capacity.

In addition, the external waste fluidic system 200 may be used to extract fluids other than the waste fluid. For example, after the analysis operations of the flow-cytometer-based system are complete, the external waste pump 210 may be used to extract a bleaching agent from a bleach container of the internal waste fluidic system 100 into the bulk container 220. As another example, after the analysis operations of the flow-cytometer-based system are complete, the external waste pump 210 may extract a cleaning agent (such as a detergent or an antimicrobial) from a cleaning agent container of the flow-cytometer-based system into the bulk container 220.

The external waste pump 210 can be a peristaltic pump or alternatively any other suitable type of pump. The external waste pump 210 can have a known flow rate to pump speed ratio such that a control of speeds of the external waste pump 210 corresponds to a control of the flow rate of the waste fluid.

Referring again to FIG. 3, the valve 230 connects the external waste pump 210 at one end and the bulk container 220 at the other end and functions to facilitate the control of the waste fluid flow. The optional valve 230 can be a check-valve, such as a spring loaded check valve, but may alternatively be any suitable valve such as a by-pass valve, a restrictive valve, and/or a shutoff valve.

The platform/load cell 225 is a measurement device to measure a primary parameter of the waste fluid contained by the bulk container 220. Referring to FIG. 3, the platform/load cell 225 is preferably arranged such that it does not directly contact the waste fluid in the bulk container 220. In an embodiment, the platform/load cell 225 includes one or more capacitive sensors disposed on or near the bulk container 220. The capacitive sensors can sense: (1) the discrete presence or absence of the bulk container 220; (2) the discrete presence or absence of the waste fluid in the bulk container 220; or (3) capacity of the waste fluid in the bulk container 220. Alternatively, the platform/load cell 225 may include one or more sensors to measure the weight, optical properties, acoustic properties or the like of the waste fluid and then calculate the volume of the waste fluid in the hulk container 220 based on the measurements.

As illustrated by FIG. 3, the float sensor 280 measures a secondary parameter, such as a level of the waste fluid contained by the bulk container 220, and is coupled to the power/control unit 260. If the platform/load cell 225 fails to function, the power/control unit 260 may determine that the bulk container 220 is full based a measurement of the level provided by the float sensor 280, in order to stop overflow of the bulk container 220. In other words, the float sensor 280 may operate as a backup sensor in addition to the main sensor of the platform/load cell 225 to inhibit or prevent the waste fluid, which may include biohazard (e.g., carboy), from overflowing from the bulk container 220. The pressure sensor 250 shown in FIG. 3 measures the pressure of the bulk container 220 and provides the measurement to the power/control unit 260, allowing the power/control unit 260 to detect whether the pressure of the bulk container 220 exceeds a predetermined threshold (e.g., reaches a high enough level that may lead to an explosion or other safety issues). If the pressure does exceed the predetermined threshold, operation of the external waste pump can be suspended or shut down.

The power/control unit 260 of the external waste fluidic system 200 can be coupled to the external waste pump 210, the pressure sensor 250, the float sensor 280, and the platform/load cell 225. In an embodiment, the power/control unit 260 sets or adjusts the pump speed of the external waste pump 210 so as to set or adjust the flow rate of the waste fluid from the flow-cytometer-based system into the external waste fluidic system 200. Alternatively, the power/control unit 260 may set or adjust operation parameters of the external waste pump 210 other than the pump speed, for example, power, pressure, or pump head and the like, for setting or adjusting the flow rate of the waste fluid from the flow-cytometer-based system to the external waste fluidic system 200.

The power/control unit 260 can include a proportional-integral-derivative (PID) controller, but may alternatively be a proportional-integral (PI) controller, a proportional-derivative (PD) controller, a proportional (P) controller, or any other suitable type of controller. The power/control unit 260 may include an input device, including a keyboard, a mouse, a touch panel user interface, or other type of suitable input device, for receiving an input. In addition, the power/control unit 260 may include a display device including a display screen, a printer, or other type of suitable display device, for displaying output signals of the power/control unit 260 for a user to view. Therefore, the user may send a command input such as a predetermined pump speed value to the power/control unit 260 through the input device. When receiving the command input from the user, the power/control unit 260 sets or adjusts the external waste pump 210 of the external waste fluidic system 200 to operate at the predetermined pump speed value requested by the user.

In another embodiment, the user may send a command input through the input device to the power/control unit 260 requesting that the power/control unit 260 automatically determines the optimal pump speed for the external waste pump 210 to operate, in order to achieve the goal of making the waste fluid of the flow-cytometer-based system to flow to the bulk container 220 of the external waste fluidic system 200 through the internal Waste three-way connector 150.

Figure 4:
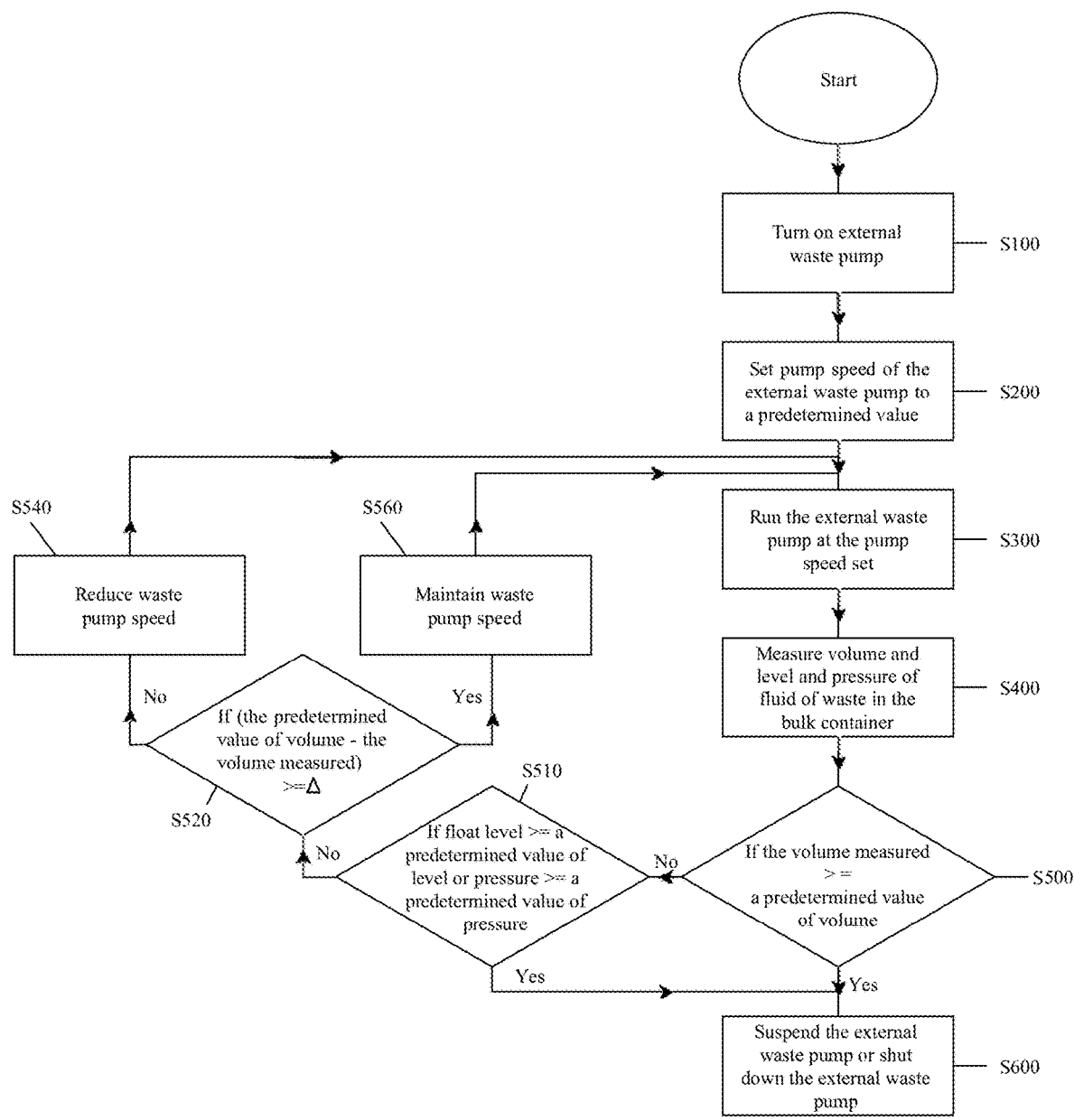
FIG. 4 is a flow diagram illustrating operations of the waste fluidic system illustrated in FIG. 3 according to an embodiment of the subject invention.

FIG. 4 is a flow diagram of an example process of configuring the external waste fluidic system 200 of FIG. 3 to extract the waste fluid from the flow-cytometer-based system to the external waste fluidic system 200. Referring to FIG. 4, at step S100, when the flow-cytometer-based system is operated in a normal condition analyzing samples, the power/control unit 260 starts up the external waste fluidic system 200 including the external waste pump 210.

Next, at step S200, the power/control unit 260 sets the external waste pump 210 to run at a pump speed higher than the pump speed of the internal waste evacuation pump 110 of the internal waste fluidic system 100 in response to an input from the user or alternatively, automatically determines an optimal pump speed for the external waste pump 210 to run at.

Next, at step S300, the external waste pump 210 runs at the pump speed set at step S200. Because the pump speed of the external waste pump 210 is set to be higher than the pump speed of the internal waste evacuation pump 110, a pressure difference is created between the external waste fluidic system 200 and the internal waste fluidic system 100, causing the waste fluid of the flow-cytometer-based system to flow to the bulk container 220 of the external waste fluidic system 200.

For example, the external waste pump 210 and internal waste evacuation pump 110 can run simultaneously, at pump speeds in a same pump speed range of 0-100%. When the internal waste evacuation pump 110 runs at 20% of the pump speed range during a normal operation condition of the flow-cytometer-based system and runs at 50% of the pump speed range in certain special operation conditions, the power/control unit 260 may set or adjust the external waste pump 210 to be operated at a pump speed greater than 50% of the pump speed range.

Because the internal waste evacuation pump 110 and the external waste pump 210 run in parallel and compete with each other, when the external waste pump 210 runs at a pump speed higher than the internal waste evacuation pump 110, a net suction is generated and applied to the tubing leading to the internal bulk waste tank 140, thereby drawing the waste fluid generated by the flow-cytometer-based system to flow to the bulk container 220 of the external waste fluidic system 200 through the internal waste three-way connector 150 of the internal waste fluidic system 100.

Next, at step S400, the platform/load cell 225 having one or more sensors senses or measures the volume of the waste fluid in the bulk container 220, the float sensor 280 may measure the level of the waste fluid, and the pressure sensor 250 may measure the pressure of the bulk container 220. The measurement result or results of the volume, the level of waste fluid, and the pressure are transmitted to the power/control unit 260. In some cases, only one measurement (e.g., the volume by the platform/load cell 225) may be taken and transmitted, if the measurement is outside a normal operating range. In some cases, only two measurements (e.g., the volume by the platform/load cell 225 and either one of the level of the waste fluid by the float sensor 280 or the pressure of the bulk container by the pressure sensor 250) may be taken and transmitted, if the either measurement is outside a normal operating range.

Next, at step S500, when receiving the measurement results, the power/control unit 260 determines whether the volume of the waste fluid is greater than or equal to a predetermined threshold value. If it is determined that the volume measured is greater than or equal to the predetermined threshold value, to avoid an overflow at the bulk container 220, at step S600, the power/control unit 260 suspends or shuts down the operation of the external waste pump 210. As a result, there is no pump competing with the running internal waste evacuation pump 110. Consequently, the net suction between the external waste fluidic system 200 and the internal waste fluidic system 100 causes the waste fluid of the flow-cytometer-based system to flow only to the internal bulk waste tank 140 of the internal waste fluidic system 100, not to the external waste fluidic system 200.

If, at step S500 it is determined that the volume measured is smaller than the predetermined threshold value, then at step S510, the power/control unit 260 determines whether the level of the waste fluid is greater than or equal to a predetermined threshold value of level or the pressure of the bulk container 220 is greater than or equal to a predetermined threshold value of pressure. If it is determined that the level measured is greater than or equal to the predetermined threshold value of level or the pressure measured is greater than or equal to the predetermined threshold value of pressure, to avoid an overflow at the bulk container 220 or occurrences of hazardous conditions in the bulk container 220, at step S600, the power/control unit 260 suspends or shuts down the operation of the external waste pump 210. In some cases, only one of these measurements may be taken; if the measurement exceeds the threshold value, operation may be ceased and it may not be necessary to take the other measurement at that time.

On the other hand, if, at the step S510, it is determined that both the level measured is smaller than the predetermined threshold value of level and the pressure measured is smaller than the predetermined threshold value of pressure, then at optional step S520, the difference between the volume measured and the predetermined threshold value of volume is calculated and the difference is compared with a predetermined delta value. At optional step S540, if it is determined that the difference is greater than or equal to the predetermined delta value, the power/control unit 260 decreases the pump speed of the external waste pump 210 to reduce the inflow of the waste fluid to the external waste fluidic system 200 and at the same time, issues an alarm signal to the user in anticipation for an overflow at the bulk container 220. If at optional step S520, it is determined that the difference is smaller than the predetermined delta value, then at step S560, the power/control unit 260 maintains the external waste pump 210 to run at the set pump speed until the measurement result is greater than or equal to a predetermined threshold value.

Alternatively, at the step S510, if it is determined that the level measured is smaller than the predetermined threshold value of level and the pressure measured is smaller than the predetermined threshold value of pressure, and if the optional steps S520 and S540 are not performed, the power/control unit 260 may, at step S560, maintain the external waste pump 210 to run at the set pump speed until the measurement result is greater than or equal to a predetermined threshold value. In an embodiment, the external waste fluidic system 200 operates independent of any signal/input from the flow-cytometer-based system. In other words, there is no deliberate signal communication between the external waste fluidic system 200 and the flow-cytometer-based system. Even though the systems are connected and in operable communication or operation via at least the tubing (or other connection means), there is no deliberate sending or receiving of signals between the systems (e.g., electric/electronic signals, magnetic signals, optical signals, pressure signals, pneumatic signals, or strain signals). Therefore, the external waste fluidic system 200 carries out its functionalities free of any signal communication with the flow-cytometer-based system.

In another embodiment, the external waste fluidic system 200 may be operated with signal communications with the flow-cytometer-based system. In other words, the external waste fluidic system 200 carries out its functionalities in response to an input or request signal from the existing flow-cytometer-based system and by transmitting an output or feedback signal to the existing flow-cytometer-based system.

Figure 5:
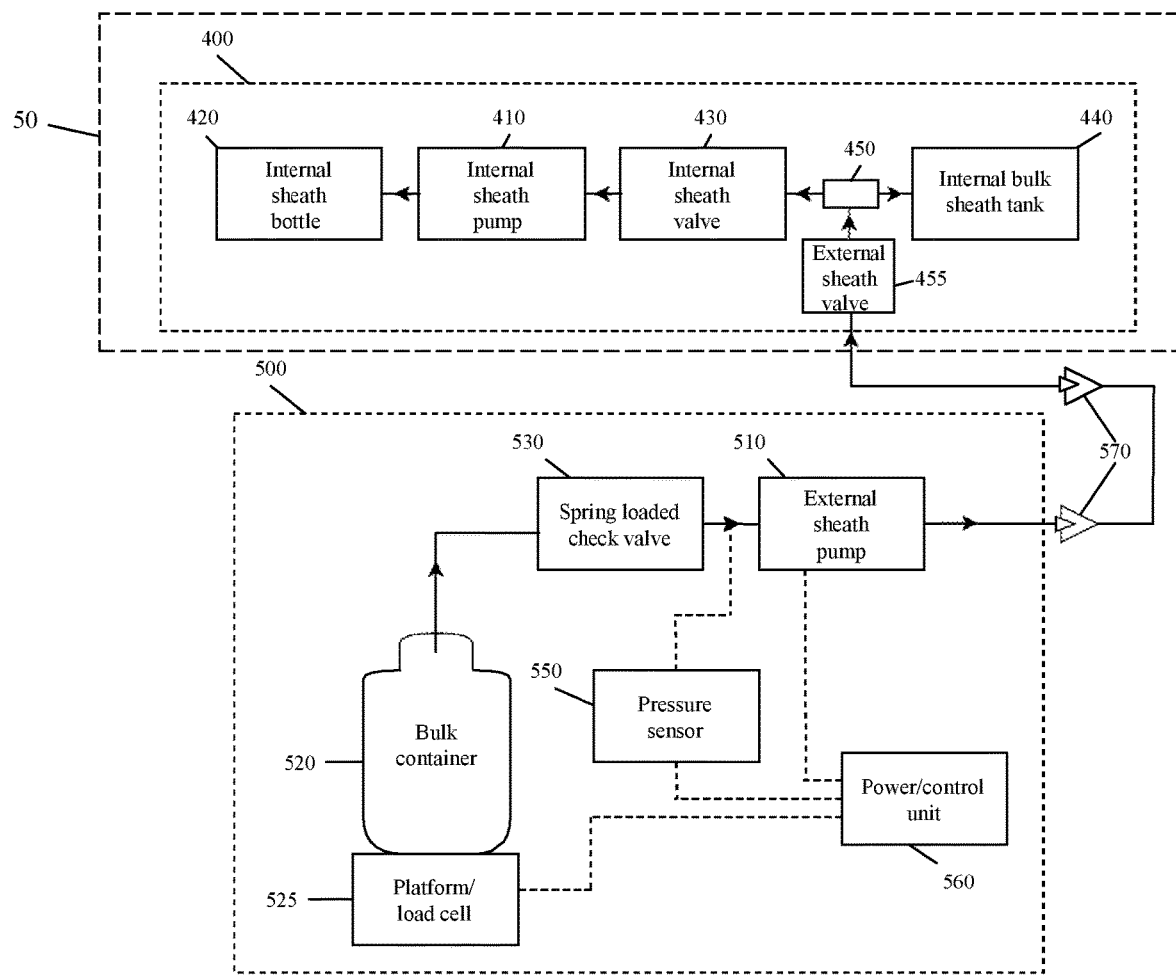
FIG. 5 is a schematic view of an external sheath fluidic system connected to an internal sheath fluidic system of a flow-cytometer-based system according to an embodiment of the subject invention.

FIG. 5 is a schematic view of an external sheath fluidic system connected to an (optional) internal sheath fluidic system of a flow-cytometer-based system 50 according to an embodiment of the subject invention. Referring to FIG. 5, an external sheath fluidic system 500 for supplying sheath fluid can include: an external sheath pump 510 supplying the sheath fluid to the (optional) internal sheath fluidic system 400 of the existing flow-cytometer-based system 50, and pumping the sheath fluid from a bulk container 520 connected to the external sheath pump 510 via an optional valve 530; a pressure sensor 550 coupled to the connecting tubing between the external sheath pump 510 and the valve 530 to sense pressures of the external sheath pump 510; a platform/load cell 525 coupled to the bulk container 520 for measuring parameters of the fluid contained by the bulk container 520; and a power/control unit 560 coupled to the external sheath pump 510, the pressure sensor 550, and the platform/load cell 525 to implement control functionalities of the external sheath fluidic system 500.

The external sheath fluidic system 500 includes a pressure regulator (not shown) or a power source (not shown) connected to the external sheath fluidic system 500 to supply power to the external sheath fluidic system 500. The external sheath fluidic system 500 of FIG. 5 may include connection tubing and/or a coupler such as a dry break connector 570 to be connected to the existing flow-cytometer-based system, but may be alternatively connected to any suitable system.

The existing flow-cytometer-based system 50 that the external sheath fluidic system 500 is capable of connecting to may include an internal sheath fluidic system 400. The internal sheath fluidic system 400 is optional, though the internal hulk sheath tank 440 will generally be present in most cases. If presets, the internal sheath fluidic system 400 includes an internal sheath pump 410 to supply the sheath fluid to the internal sheath bottle 420 from the internal bulk sheath tank 440. An internal sheath valve 430 (e.g., a sheath valve that can control which internal sheath tank the sheath is directed to, such as the ½ valve in the Bio-Rad ZE5 system), an internal sheath three-way connector 450, and an external source valve 455 can be disposed between the internal sheath pump 410 and the internal bulk sheath tank 440. The external sheath fluidic system 500 may be connected to the internal sheath fluidic system 400 through the internal sheath three-way connector 450 and the external source valve 455.

When a level of the sheath fluid in the internal bulk sheath tank 440 is lower than a predetermined level (for example, less than half full), the external source valve 455 may be configured to allow the internal bulk sheath tank 440 to be filled from the bulk container 520; and when the level of the sheath fluid in the internal bulk sheath tank 440 reaches a certain predetermined level (e.g., 75% full), the external source valve 455 may be configured to close in order to stop filling the internal bulk sheath tank 440 from the bulk container 520. The bulk container 520 may be used to contain the sheath fluid supplied to the flow-cytometer-based system and works as an extra storage in additional to the internal bulk sheath tank 440 of the internal sheath fluidic system 400, thereby enlarging the capacity of the flow-cytometer-based system for storage of the sheath fluid when connecting the external sheath fluidic system 500 to the flow-cytometer-based system. The bulk container 520 can be, for example, a tank with a volume of approximately 20l and the bulk container 520 may alternatively be any suitable container of any capacity.

In addition, the external sheath fluidic system 500 may be used to supply fluids other than the sheath fluid. For example, after the analysis operations of the flow-cytometer-based system is complete, the external sheath pump 510 may be used to supply a bleaching agent to a bleach container of the internal sheath fluidic system 400 from the bulk container 520. As another example, after the analysis operations of the flow-cytometer-based system is complete, the external sheath pump 510 may supply a cleaning agent (such as a detergent or an antimicrobial) to a cleaning agent container of the flow-cytometer-based system from the bulk container 520.

The external sheath pump 510 can be a peristaltic pump or alternatively any other suitable type of pump. The external sheath pump 510 can have a known flow rate to pump speed ratio such that a control of speeds of the external sheath pump 510 corresponds to a control of the flow rate of the sheath fluid.

Referring again to FIG. 5, the valve 530 connects the external sheath pump 510 at one end and the bulk container 520 at the other end and functions to facilitate the control of the sheath fluid flow. The optional valve 530 can be a check-valve, such as a spring loaded check valve, but may alternatively be any suitable valve such as a by-pass valve, a restrictive valve, and/or a shutoff valve.

The platform/load cell 525 is a measurement device to measure parameters of the sheath fluid contained by the bulk container 520. The platform/load cell 525 can be arranged such that is does not directly contact the sheath fluid in the bulk container 520, in an embodiment, the platform/load cell 525 includes one or more capacitive sensors disposed on or near the bulk container 520. The capacitive sensors can sense: (1) the discrete presence or absence of the bulk container 520; (2) the discrete presence or absence of the sheath fluid in the bulk container 520; or (3) capacity or a level of the sheath fluid in the bulk container 520. Alternatively, the platform/load cell 525 may include one or more sensors to measure the weight, optical properties, acoustic properties or the like of the sheath fluid and then calculate the volume or level of the sheath fluid in the bulk container 520 based on the measurement.

The power/control unit 560 of the external sheath fluidic system 500 can be coupled to the external sheath pump 510 the pressure sensor 550, and the platform/load cell 525. In an embodiment, the power/control unit 560 sets or adjusts the pump speed of the external sheath pump 510 so as to set or adjust the flow rate of the sheath fluid supplied to the flow-cytometer-based system from the external sheath fluidic system 500. Alternatively, the power/control unit 560 may set or adjust operation parameters of the external sheath pump 510 other than the pump speed, for example, power, pressure, or pump head and the like, for setting or adjusting, the flow rate of the sheath fluid supplied to the flow-cytometer-based system from external waste fluidic system 500.

The power/control unit 560 can include a proportional-integral-derivative (PID) controller, but may alternatively be a proportional-integral (PI) controller, a proportional-derivative (PD) controller, a proportional (P) controller, or any other suitable type of controller. The power/control unit 560 may include an input device, including a keyboard, a mouse, a touch panel user interface, or other type of suitable input device, for receiving an input. In addition, the power/control unit 560 may include a display device including a display screen, a printer, or other type of suitable display device, for displaying output signals of the power/control unit 560 for a user to view. Therefore, the user may send a command input such as a predetermined pump speed value to the power/control unit 560 through the input device. When receiving the command input from the user, the power/control unit 560 sets or adjusts the external sheath pump 510 of the external sheath fluidic system 500 to operate at predetermined pump speed value requested by the user.

In another embodiment, the user may send a command input through the input device to the power/control unit 560 requesting that the power/control unit 560 automatically determines the optimal pump speed for the external sheath pump 510 to operate at, in order to achieve the goal of supplying the sheath fluid to the flow-cytometer-based system from the bulk container 520 of the external sheath fluidic system 500 through the internal sheath three-way connector 450.

When the flow-cytometer-based system is operated in a normal condition analyzing samples, the internal sheath pump 410 keeps running to supply the sheath fluid from the internal bulk sheath tank 440 to the internal sheath bottle 420. When a level of the sheath fluid in the internal bulk sheath tank 440 drops below a first predetermined level (for example, 50% full), the external source valve 455 is configured to open, causing the external sheath fluidic system 500 shown in FIG. 5 to supply the sheath fluid from the bulk container 520 to the flow-cytometer-based system.

Figure 6:
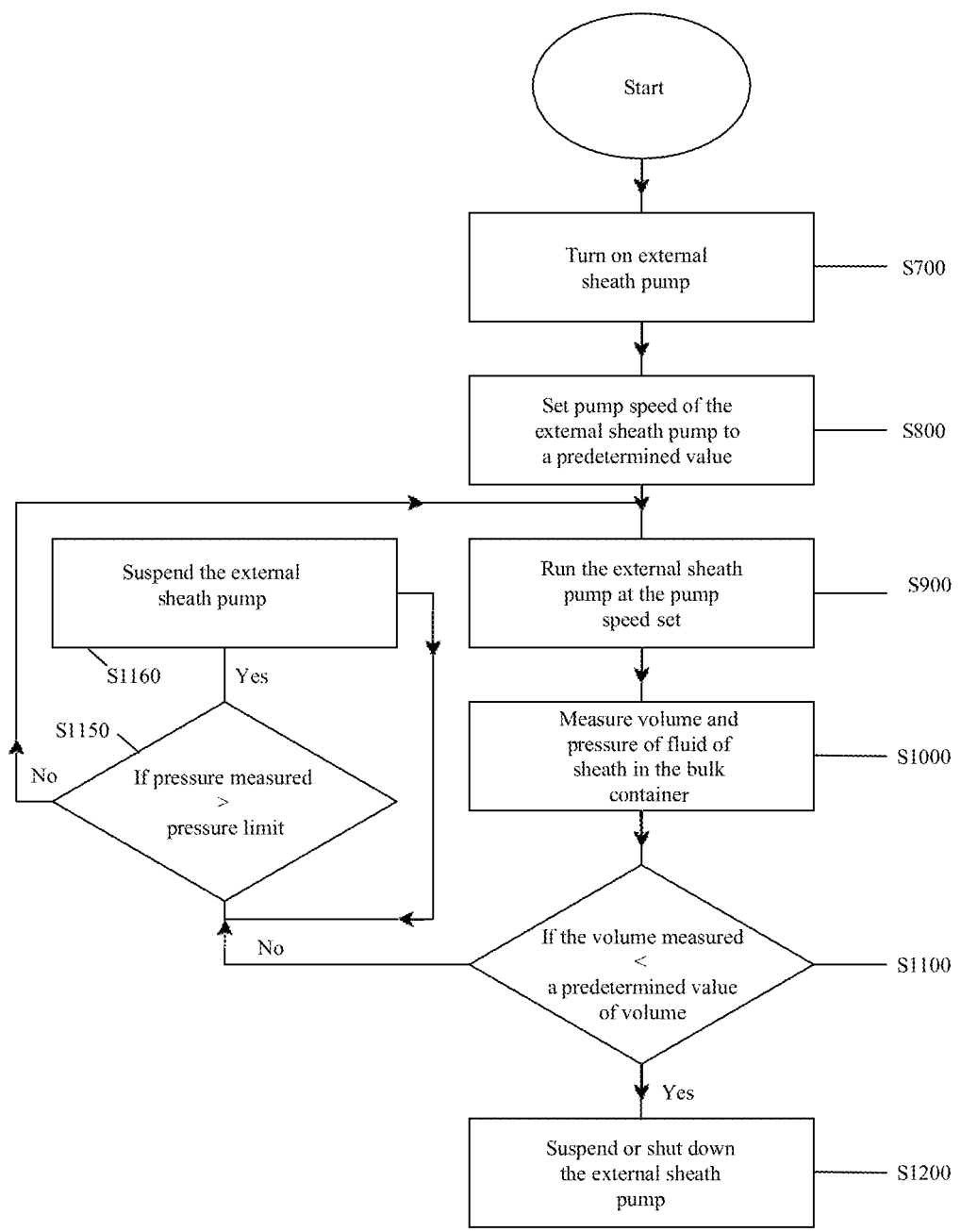
FIG. 6 is a flow diagram illustrating operations of the sheath fluidic system illustrated in FIG. 5 according to an embodiment of the subject invention.

FIG. 6 is a flow diagram of an example process of configuring the external sheath fluidic system 500 to supply the sheath fluid to the flow-cytometer-based system. Referring to FIG. 6, at step S700, when the power/control unit 560 senses that the external source valve 455 is open causing the pressure of the external sheath fluidic system 500 to change, the power/control unit 560 starts up the external sheath pump 510.

Next, at step S800, the power/control unit 560 sets the external sheath pump 510 to run at a pump speed to generate a pressure of the external sheath fluidic system 500 that is sufficiently higher than a pressure of the internal sheath fluidic system 400 in response to an input or, alternatively, automatically determines an optimal pump speed for the external sheath pump 510 to run at.

Next, at step S900, the external sheath pump 510 runs at the pump speed set at step S800. The sheath fluid contained in the bulk container 520 is pumped to the internal bulk sheath tank 440 due to the sufficient high pressure difference between the external sheath fluidic system 500 and the internal sheath fluidic system 400.

Next, at step S1000, the platform/load cell 525 having one or more sensors senses or measures the volume of the sheath fluid in the bulk container 520 and the pressure sensor 550 senses or measures the pressure of the external sheath fluidic system 500. The measurement results of the volume and the pressure are transmitted to the power/control unit 560.

Next, at step S1100, when receiving the measurement results, the power/control unit 560 determines whether the volume measured is smaller than a predetermined threshold value of volume. If it is determined that the volume measured is smaller than the predetermined threshold value for the volume, to avoid pumping from an empty bulk container 520, at step S1200, the power/control unit 560 suspends or shuts down the operation of the external sheath pump 510. As a result, there is no external sheath fluid flowing to the internal bulk sheath tank 440 Consequently, the flow-cytometer-based system continues to operate with the internal sheath fluidic system 400 causing the sheath fluid to be supplied only from the internal bulk sheath tank 440 of the internal sheath fluidic system 400, not from the external sheath fluidic system 500. If, at step S1100, it is determined that the volume measured is greater than or equal to the predetermined threshold value for the volume, then, at step S1150, the power/control unit 560 determines whether the pressure measured is greater than a predetermined threshold value for the pressure.

In the internal sheath fluidic system 400 when the level of sheath fluid in the internal bulk sheath tank 440 reaches a second predetermined level (for example, 75% full) that is greater than the first predetermined level, the external source valve 455 is configured to close. At step S1150, when the power/control unit 560 senses that the external source valve 455 is closed causing the pressure of the external sheath fluidic system 500 to go up to a level greater than the predetermined threshold value for the pressure, to avoid occurrences of pump running dead with leakage conditions in the external sheath fluidic system 500, at step S1160, the power/control unit 560 suspends the operation of the external sheath pump 510 and only turns the external sheath pump 510 back on when the pressure measured is determined to be smaller than or equal to the predetermined threshold value for the pressure. On the other hand, if, at step S1150, it is determined that the pressure measured is smaller than or equal to the predetermined threshold value for the pressure, then the power/control unit 560 maintains the external sheath pump 510 to run at the set pump speed.

Such processes of filling the internal bulk sheath tank 440 with the sheath fluid from the bulk container 520 by starting and suspending the external sheath pump 510 repeat until a volume of the sheath fluid in the bulk container 520 is smaller than the predetermined threshold value for the volume (for example, until the bulk container 520 becomes empty). In an embodiment, the external sheath fluidic system 500 operates independent of any signal/input from the flow-cytometer-based system. In other words, there is no deliberate signal communication between the external sheath fluidic system 500 and the flow cytometer-based system. Even though the systems are connected and in operable communication or operation via at least the tubing (or other connection means), there is no deliberate sending or receiving of signals between the systems (e.g., electric/electronic signals, magnetic signals, optical signals, pressure signals, pneumatic signals, or strain signals). Therefore, the external sheath fluidic system 500 carries out its functionalities free of any signal communication with the flow-cytometer-based system.

In another embodiment, the external sheath fluidic system 500 may be operated with signal communications with the flow-cytometer-based system. In other words, the external sheath fluidic system 500 carries out its functionalities in response to an input or request signal from the existing flow-cytometer-based system and by transmitting an output or feedback signal to the existing flow-cytometer-based system.

In some embodiments, different color caps can be used on the various components to help easily distinguish different containers (e.g., bulk container, internal bulk sheath tank, etc.) from each other and/or different valves or pumps from each other.

Figure 7:
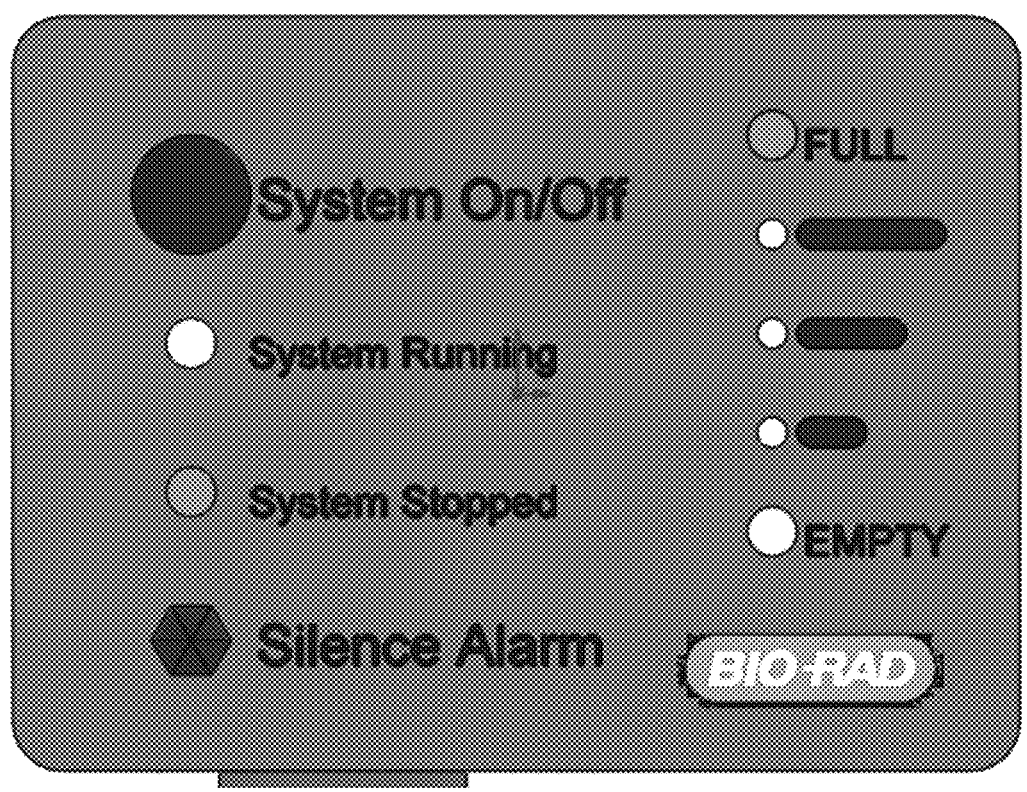
FIG. 7 is a schematic representation of a user interface of a control panel according to an embodiment of the subject invention.

FIG. 7 provides illustrations of a user interface of a control panel (for example, an electro-mechanical control switch) of certain embodiments of the subject invention. It should be understood that the user interface shown in FIG. 7 is merely for illustrative purposes and should not be construed as intending to limit how and in what manner the external fluidic system or the flow-cytometer-based system carries out its functionalities.

As shown in FIG. 7, the user interface of the control panel can include: a System On/Off button to switch the external waste pump or the external sheath pump on or off; a System Running LED indicating the status of the above mentioned pumps wherein when the System Running LED is on, it indicates that the pumps are on and running; and a System Stopped LED indicating the status of the pumps wherein when the System Stopped LED is on, it indicates that the pumps are stopped. In addition, the user interface of the control panel can include a Silence Alarm button, which when pressed and then immediately released, causes an alarm signaling a hazardous condition (for example, the bulk container is full of waste fluid) of the external fluidic system to be silenced. In addition, when the Silence Alarm button is pressed and held for an extended period of time (for example, 5 seconds), the volume of the alarm sound can be adjusted. For example, when the Silence Alarm button is pressed and held for more than 5 seconds, the volume of the alarm sound can increase until the maximum volume is reached. If the Silence Alarm button is pressed and held for more than 5 seconds after the maximum volume is reached, the sound of the alarm can be silenced or the volume can decrease gradually until it is silenced. Distinguishable color caps can be used for the buttons of the user interface of the control panel to distinguish different functionalities of these buttons.

The user interface of the control panel can further include a Full LED indicator (for example, it can be green for the external sheath fluidic system and turn red and flashing for the external waste fluidic system when the bulk container for containing waste fluid is full). An Empty LED can be included (for example, it can be green for the external waste fluidic system and turn red and flashing for the external sheath fluidic system when the bulk container for containing the sheath fluid is empty. A group of Level LEDs can also be included indicting different levels (for example, ¼ full, ½ full, or ¾ full) of the fluid contained in the bulk container.

Further, the user interface of the control panel can include one or more hidden buttons that are not labeled or otherwise marked and are intended to be exclusively accessible to authorized personnel for service use. One of the hidden buttons can be an empty calibration button for calibration of an empty bulk container at service time. For example, when the empty calibration button is pressed and held for more than 5 seconds, values of certain parameters of the empty bulk container will be stored in a storage device such as a flash memory of a controller board (for example, a microcontroller or an FPGA controller). The other hidden button can be a full calibration button for calibration of a full bulk container. For example, when the full calibration button is pressed and held for more than 5 seconds, values of certain parameters of the full bulk container can be stored in a storage device such as a flash memory of a controller board (for example, a microcontroller or an FPGA controller).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1. A fluidic system capable of being connected with a primary system, the fluidic system comprising:
　a(t least one) container;
　a(t least one) tubing configured to be capable of being connected (or to connect) to the primary system;
　a second pump;
　a measurement device; and
　a controller in operable communication with the second pump and the measurement device.

Embodiment 2. The fluidic system according to embodiment 1, wherein the primary system comprises a flow-cytometer-based system, and wherein the fluidic system is configured such that, in operation:
　the container contains a first fluid, the first fluid being a sheath fluid flowing to the flow-cytometer-based system or a waste fluid flowing from the flow-cytometer-based system.

Embodiment 3. The fluidic system according to embodiment 2, wherein the primary system comprises a flow-cytometer-based system, and wherein the fluidic system is configured such that, in operation:
　the second pump is operated to supply the first fluid from the container to the flow-cytometer-based system, when the first fluid is the sheath fluid, and to extract the first fluid from the flow-cytometer-based system and provide it to the container, when the first fluid is the waste fluid.

Embodiment 4. The fluidic system according to any of embodiments 2-3, wherein the fluidic system is configured such that, in operation:
　the measurement device measures a property of the first fluid in the container and transmits the measurement result to the controller.

Embodiment 5. The fluidic system according to embodiment 4, wherein the fluidic system is configured such that, in operation:
　when receiving the measurement result, the controller determines whether the measurement result is greater than or equal to a predetermined threshold value.

Embodiment 6. The fluidic system according to embodiment 5, wherein the fluidc system is configured such that, in operation: when the controller determines that the measurement result is greater than or equal to the predetermined threshold value, the controller adjusts an operation condition of the second pump to suspend or stop supplying the first fluid from the container to the flow-cytometer-based system, when the first fluid is the sheath fluid, and to suspend or stop extracting the first fluid from the flow-cytometer-based system and providing it to the container, when the first fluid is the waste fluid.

Embodiment 7. The fluidic system according to any of embodiments 5-6, wherein the system is configured such that, in operation: when the controller determines that the measurement result is smaller than the predetermined threshold value, the controller maintains the operation condition of the second pump constant.

Embodiment 8. The fluidic system according to any of embodiments 1-7, wherein the primary system comprises a flow-cytometer-based system having a first pump, and wherein the operating, by the controller, of the fluidic system comprises setting or adjusting, by the controller, the second pump to run at a pump speed higher than a pump speed at which the first pump runs, when the container contains a waste fluid flowing from the flow-cytometer-based system.

Embodiment 9. The fluidic system according to any of embodiments 1-8, wherein the primary system comprises a flow-cytometer-based system and wherein the controller is configured to perform the operating of the fluidic system based on a condition of the flow-cytometer-based system without any signal communications with the flow-cytometer-based system.

Embodiment 10. The fluidic system according to any of embodiments 1-9, wherein the primary system comprises a flow-cytometer-based system and wherein the fluidic system is configured to hot-swap connect to the flow-cytometer-based system at runtime.

Embodiment 11. A method for using a fluidic system, the fluidic system comprising a(t least one) container, a(t least one) tubing connecting the fluidic system to a flow-cytometer-based system that has a first pump, a measurement device, a second pump, and a controller in operable communication with the second pump and the measurement device,
　wherein the container contains a first fluid that is a sheath fluid flowing to the flow-cytometer-based system or a waste fluid flowing from the flow-cytometer-based system, and
　wherein the method comprises:
　operating, by the controller, the fluidic system supplies the first fluid from the container to the flow-cytometer-based system, when the first fluid is the sheath fluid, and extracts the first fluid from the flow-cytometer-based system and provides it to the container, when the first fluid is the waste fluid.

Embodiment 12. The method according to embodiment 11, further comprising:
　measuring, by the measurement device, a property of the first fluid in the container and transmitting the measurement result to the controller; and
　determining, by the controller, whether the measurement result received is greater than or equal to a predetermined threshold value.

Embodiment 13. The method according to embodiment 12, further comprising:
　when the controller determines that the measurement result is greater than or equal to the predetermined threshold value, adjusting, by the controller, an operation condition of the second pump to suspend or stop supplying the first fluid from the container to the flow-cytometer-based system, when the first fluid is the sheath fluid, and to suspend or stop extracting the first fluid from the flow-cytometer-based system and providing it to the container, when the first fluid is the waste fluid.

Embodiment 14. The method according to any of embodiments 12-13, further comprising:
　when the controller determines that the measurement result is smaller than the predetermined threshold value, maintaining, by the controller, the operation condition of the second pump constant.

Embodiment 15. The method according to any of embodiments 11-14, wherein operating the fluidic system comprises setting or adjusting, by the controller, the second pump to run at a pump speed that is higher than a pump speed at which the first pump is running, when the container contains a waste fluid flowing from the flow-cytometer-based system.

Embodiment 16. The method according to any of embodiments 11-15, wherein operating the second pump is performed by the controller without any signal communications with the flow-cytometer-based system.

Embodiment 17. The method according to any of embodiments 11-16, wherein the fluidic system is configured to hot-swap connect to the flow-cytometer-based system at runtime.

Embodiment 18. A system for cell/particle characterization or separation, the system comprising:
a flow cytometer comprising a first pump; and
a fluidic system in operable communication with the flow cytometer,
wherein the fluidic system comprises:
a(t least one) container;
a(t least one) tubing connected to the flow cytometer;
a second pump;
a measurement device; and
a controller in operable communication with the second pump and the measurement device, wherein the controller is configured to operate the fluidic system based on a condition of the flow cytometer.

Embodiment 19. The system according to embodiment 18, wherein the fluidic system is configured such that, in operation:
the container contains a first fluid, the first fluid being a sheath fluid flowing to the flow cytometer or a waste fluid flowing from the flow cytometer.

Embodiment 20. The system according to embodiment 19, wherein the fluidic system is configured such that, in operation:
the second pump is operated to supply the first fluid from the container to the flow cytometer, when the first fluid is the sheath fluid, and to extract the first fluid from the flow cytometer and provide it to the container, when the first fluid is the waste fluid.

Embodiment 21. The system according to any of embodiments 19-20, wherein the fluidic system is configured such that, in operation:
the measurement device measures a property of the first fluid in the container and transmits the measurement result to the controller.

Embodiment 22. The system according to embodiment 21, wherein the fluidic system is configured such that, in operation:
when receiving the measurement result, the controller determines whether the measurement result is greater than or equal to a predetermined threshold value.

Embodiment 23. The system according to embodiment 22, wherein the fluidic system is configured such that, in operation: when the controller determines that the measurement result is greater than or equal to the predetermined threshold value, the controller adjusts an operation condition of the second pump to suspend or stop supplying the first fluid from the container to the flow cytometer, when the first fluid is the sheath fluid, and to suspend or stop extracting the first fluid from the flow cytometer and providing it to the container, when the first fluid is the waste fluid.

Embodiment 24. The system according to any of embodiments 22-23, wherein the fluidic system is configured such that, in operation: when the controller determines that the measurement result is smaller than the predetermined threshold value, the controller maintains the operation condition of the second pump constant.

Embodiment 25. The system according to any of embodiments 18-24, wherein the operating, by the controller, of the fluidic system based on a condition of the flow cytometer comprises setting or adjusting, by the controller, the second pump to run at a pump speed higher than a pump speed at which the first pump runs, when the container contains a waste fluid flowing from the flow-cytometer-based system.

Embodiment 26. The system according to any of embodiments 18-25, wherein the controller is configured to perform the operating of the fluidic system based on signal communications with the flow-cytometer-based system.

Embodiment 27. The method according to any of embodiments 18-26, wherein the fluidic system is configured to hot-swap connect to the flow cytometer system at runtime.

Embodiment 28. The fluidic system according to any of embodiments 1-10, wherein the operating, by the controller, of the fluidic system based on a condition of the flow-cytometer-based system comprises setting or adjusting, by the controller, a pressure of fluidic system based on a pressure of the flow-cytometer-based system, when the container contains a sheath fluid flowing to the flow-cytometer-based system.

Embodiment 29. The method according to any of embodiments 11-17, wherein the operating the fluidic system based on a condition of the flow-cytometer-based system comprises setting or adjusting, by the controller, a pressure of fluidic system based on a pressure of the flow-cytometer-based system, when the container contains a sheath fluid flowing to the flow-cytometer-based system.

Embodiment 30. The system according to any of embodiments 18-27, wherein the operating, by the controller, of the fluidic system based on a condition of the flow-cytometer-based system comprises setting or adjusting, by the controller, a pressure of fluidic system based on a pressure of the flow-cytometer-based system, when the container contains a sheath fluid flowing to the flow-cytometer-based system.

In many embodiments, the external fluidic system can include one or more sheath fluid containers, one or more waste fluid containers, or a combination of any number of waste fluid containers and sheath fluid containers.

In certain embodiments, the external fluidic system can include additional control functions including, but not limited to:
(1) control the external waste pump or the external sheath pump based on an input from a user, an indication of fluid level of the bulk container, a pressure level, and/or an indication of a faulty operation such as that a sensor is not properly installed;
(2) alarm the user when the bulk waste container is full or the bulk sheath container is empty;
(3) control the alarm by either temporarily stopping the alarm or adjusting the volume of the alarm after a period of time or in response to an input from the user;
(4) display level information of the bulk container with an LED display, and flash the LED when the bulk waste container is full or the bulk sheath container is empty;
(5) calibrate the sensors of the platform/load cell; and/or
(6) display an error code on a control panel in case that a faulty operation occurs.

The external fluidic system may further include a mass storage device capable of storing and accessing software instructions and/or data to carry out the above mentioned certain methods and processes. In an alternative embodiment, the above mentioned methods and processes can be carried out by hardware implementations including but are not limited to, application-specific integrated circuit (ASIC) chips, field programmable gate arrays (FPGAs), and other programmable logic devices now known or later developed.

When the external fluidic system as illustrated by the embodiments of subject invention is connected to an existing flow-cytometer-based system, the overall capacity of the waste storage or the sheath storage of the existing flow-cytometer-based system can be easily expanded beyond its designed maximum capacity. Moreover, the external fluidic system can be hot plugged into or hot unplugged from the existing flow-cytometer-based system that runs an analysis of samples. Because the external fluidic system may operate without receiving a deliberate signal from or transmitting a deliberate signal to the existing flow-cytometer-based system, none of the components, structures, connections, control procedures, software program/data of the existing flow-cytometer-based system needs to be altered or reconfigured. Thus, the external fluidic system can be connected to a running flow-cytometer-based system as a hot swap connection option without interruptions to the operations of the flow-cytometer-based system. Further, because the external fluidic system is a self-contained system capable of being connected to an existing flow-cytometer-based system, it requires minimal efforts for maintenance and service, making it very suitable for commercial applications.

As a person skilled in the art of flow cytometry will recognize from the previous detailed description and from the figures and claims, modifications and changes can be made to the embodiments of the invention without departing from the scope of this invention defined in the following claims.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A fluidic system capable of being connected with a primary system, the primary system comprising a first pump that is an internal sheath pump or an internal waste pump, the fluidic system comprising:
   a container configured to contain a liquid;
   a tubing configured to be capable of being connected to the primary system;
   a dry break connector connected to a first end of the tubing;
   a second pump connected to a second end of the tubing opposite the first end;
   a pressure sensor configured to sense a pressure of the fluidic system between the second pump and the container;
   a measurement device coupled with the container and configured to measure a signal indicative of a volume of the liquid in the container;
   a float sensor coupled with the container and configured to measure a level of the liquid in the container;
   a controller in operable communication with the second pump, the pressure sensor, the measurement device, and the float sensor, the controller being configured to adjust speeds of the second pump based on a measurement result of the signal indicative of the volume of the liquid in the container; and
   a control panel in operable communication with the second pump and comprising a system on/off button configured to switch the second pump on or off, a system running indicator light configured to light up when the fluidic system is running, a system stopped indicator light configured to light up when the fluidic system is stopped, a silence alarm button configured to cause an alarm when pressed by a user, a full indicator light configured to light up when the second pump is full, an empty indicator light configured to light up when the second pump is empty, and at least one partially full indicator light configured to light up when the second pump is filled to a level indicated by the respective partially full indicator light,
   wherein the controller is further configured to stop the second pump if the float sensor indicates that the level of the liquid in the container is full, when the container contains a waste fluid flowing from the primary system,
   wherein the controller is further configured to set the pressure of the fluidic system, using the pressure sensor to determine when a desired pressure of the fluidic system is reached, and
   wherein the controller is further configured to stop the second pump if the pressure sensor indicates the pressure of the fluidic system exceeds a predetermined threshold.

2. The fluidic system according to claim 1, wherein the primary system comprises a flow-cytometer-based system having the first pump, and wherein the controller is configured to operate the second pump to run at a pump speed higher than a pump speed at which the first pump runs when the container contains a waste fluid flowing from the flow-cytometer-based system.

3. The fluidic system according to claim 1, wherein the primary system comprises a flow-cytometer-based system, and wherein the controller is configured to operate the pressure of the fluidic system based on a pressure of the flow-cytometer-based system, when the container contains a sheath fluid flowing to the flow-cytometer-based system.

4. The fluidic system according to claim 1, wherein the primary system comprises a flow-cytometer-based system, and wherein the fluidic system is configured such that, in operation:
   the container contains a first fluid, the first fluid being a sheath fluid flowing to the flow-cytometer-based system or a waste fluid flowing from the flow-cytometer-based system;
   the second pump is operated to supply the first fluid from the container to the flow-cytometer-based system, when the first fluid is the sheath fluid, and to extract the first fluid from the flow-cytometer-based system and provide it to the container, when the first fluid is the waste fluid;
   the measurement device measures a property of the first fluid in the container and transmits the measurement result to the controller; and
   when receiving the measurement result, the controller determines whether the measurement result is greater than or equal to a predetermined threshold value.

5. The fluidic system according to claim 4, wherein the fluidic system is configured such that, in operation: when the controller determines that the measurement result is greater than or equal to the predetermined threshold value, the controller adjusts an operation condition of the second pump to suspend or stop supplying the first fluid from the container to the flow-cytometer-based system; When the first fluid is the sheath fluid, and to suspend or stop extracting the first fluid from the flow-cytometer-based system and providing it to the container, when the first fluid is the waste fluid.

6. The fluidic system according to claim 5, wherein the fluidic system is configured such that, in operation: when the controller determines that the measurement result is smaller than the predetermined threshold value, the controller maintains the operation condition of the second pump constant.

7. The fluidic system according to claim 1, wherein the primary system comprises a flow-cytometer-based system and wherein the controller is configured to perform the operating of the fluidic system without any signal communications with the flow-cytometer-based system.

8. The fluidic system according to claim 1, wherein the control panel further comprises a first hidden button that is not labeled or marked and a second hidden button that is not labeled or marked, wherein the first hidden button is configured to calibrate the container in an empty state, and wherein the second hidden button is configured to calibrate the container in a full state.

9. A method for using a fluidic system, the fluidic system comprising a container, a tubing connecting the fluidic system to a flow-cytometer-based system that has a first pump, a measurement device, a second pump, a pressure sensor, a dry break connector, a tubing connected to the dry break connector at a first end thereof and the second pump at a second end thereof, a float sensor, and a controller in operable communication with the second pump, the pressure sensor, the measurement device, and the float sensor,
wherein the container contains a first fluid that is a sheath fluid flowing to the flow-cytometer-based system or a waste fluid flowing from the flow-cytometer-based system, wherein the first fluid is a liquid,
wherein the first pump is configured to supply a fluid to the flow-cytometer-based system, when the first fluid is the sheath fluid, and to extract a fluid from the flow-cytometer-based system, when the first fluid is the waste fluid,
wherein the fluidic system further comprises a control panel in operable communication with the second pump and comprising a system on/off button configured to switch the second pump on or off, a system running indicator light configured to light up when the fluidic system is running, a system stopped indicator light configured to light up when the fluidic system is stopped, a silence alarm button configured to cause an alarm when pressed by a user, a full indicator light configured to light up when the second pump is full, an empty indicator light configured to light up when the second pump is empty, and at least one partially full indicator light configured to light up when the second pump is filled to a level indicated by the respective by the partially full indicator light,
wherein the method comprises:
operating, by the controller, the second pump to supply the first fluid from the container to the flow-cytometer-based system, when the first fluid is the sheath fluid, and to extract the first fluid from the flow-cytometer-based system and provide it to the container, when the first fluid is the waste fluid;
sensing, by the pressure sensor, the pressure of the fluidic system between the second pump and the container;
measuring, by the measurement device, a signal indicative of a volume of the first fluid in the container;
measuring, by the float sensor, a level of the first fluid in the container;
setting, by the controller, the pressure of the fluidic system, using the pressure sensor to determine when a desired pressure of the fluidic system is reached;
adjusting, by the controller, speeds of the second pump based on a measurement result of the signal indicative of the volume of the first fluid in the container; and
stopping, by, the controller, the second pump if the float sensor indicates that the level of the first fluid in the container is full or if the pressure sensor indicates the pressure of the fluidic system exceeds a predetermined threshold, the stopping of the second pump causing the system stopped indicator light to light up.

10. The method according to claim 9, further comprising:
measuring, by the measurement device, a property of the first fluid in the container and transmitting the measurement result to the controller; and
determining, by the controller, whether the measurement result received is greater than or equal to a predetermined threshold value.

11. The method according to claim 10, further comprising:
when the controller determines that the measurement result is greater than or equal to the predetermined threshold value, adjusting, by the controller, an operation condition of the second pump to suspend or stop supplying the first fluid from the container to the flow-cytometer-based system, when the first fluid is the sheath fluid, and to suspend or stop extracting the first fluid from the flow-cytometer-based system and providing it to the container, when the first fluid is the waste fluid.

12. The method according to claim 11, further comprising:
when the controller determines that the measurement result is smaller than the predetermined threshold value, maintaining, by the controller, the operation condition of the second pump constant.

13. The method according to claim 9, wherein the operating, by the controller, of the fluidic system, comprises setting or adjusting, by the controller, the second pump to run at a pump speed that is higher than a pump speed at which the first pump is running, when the container contains a waste fluid flowing from the flow-cytometer-based system; and wherein the operating, by the controller, of the fluidic system comprises setting or adjusting, by the controller, the pressure of the fluidic system higher than a pressure of the flow-cytometer-based system, when the container contains a sheath fluid flowing to the flow-cytometer-based system.

14. The method according to claim 9, wherein operating the fluidic system is performed by the controller without any signal communications with the flow-cytometer-based system.

15. The method according to claim 9, wherein the control panel further comprises a first hidden button that is not labeled or marked and a second hidden button that is not labeled or marked, wherein the first hidden button is configured to calibrate the container in an empty state, and wherein the second hidden button is configured to calibrate the container in a full state.

16. A system for cell/particle characterization or separation, the system comprising:
a flow cytometer comprising a first pump and a three-way connector, the first pump being an internal waste pump or an internal sheath pump; and a fluidic system in operable communication with the flow cytometer,
wherein the fluidic system comprises:
   a container configured to contain a liquid;
   a tubing connected to the flow cytometer via a dry break connector connected to a first end of the tubing, the dry break connector also connected with the three-way connector;
   a second pump connected to a second to a first end of the tubing opposite the first end;
   a pressure sensor configured to sense a pressure of the fluidic system between the second pump and the container;
   a measurement device coupled with the container and configured to measure a signal indicative of a volume of the liquid in the container;
a float sensor coupled with the container and configured to measure a level of the liquid in the container;
a controller in operable communication with the second pump, the measurement device, and the float sensor, the controller being configured to adjust speeds of the second pump based on a measurement result of the signal indicative of the volume of the liquid in the container; wherein the controller is further configured to operate the fluidic system based on a condition of the flow cytometer; wherein the controller is further configured to stop the second pump if the float sensor indicates that the level of the liquid in the container is full, when the container contains a waste fluid flowing from the primary system, wherein the controller is further configured to set the pressure of the fluidic system, using the pressure sensor to determine when a desired pressure of the fluidic system is reached, and wherein the controller is further configured to stop the second pump if the pressure sensor indicates the pressure of the fluidic system exceeds a predetermined threshold; and
a control panel in operable communication with the second pump and comprising a system on/off button configured to switch the second pump on or off, a system running indicator light configured to light up when the fluidic system is running, a system stopped indicator light configured to light up when the fluidic system is stopped, a silence alarm button configured to cause an alarm when pressed by a user, a full indicator light configured to light up when the second pump is full, and empty indicator light configured to light up when the second pump is empty, and at least one partially full indicator light configured to light up when the second pump is filled to a level indicated by the respective partially full indicator light.

17. The system according to claim 16, Wherein the fluidic system is configured such that, in operation:
   the container contains a first fluid, the first fluid being a sheath fluid flowing to the flow cytometer or a waste fluid flowing from the flow cytometer;
   the second pump is operated to supply the first fluid from the container to the flow cytometer, when the first fluid is the sheath fluid, and to extract the first fluid from the flow cytometer and provide it to the container, when the first fluid is the waste fluid;
   the measurement device measures a property of the first fluid in the container and transmits the measurement result to the controller; and
   when receiving the measurement result, the controller determines whether the measurement result is greater than or equal to a predetermined threshold value.

18. The system according to claim 17, wherein the fluidic system is configured such that, in operation: when the controller determines that the measurement result is greater than or equal to the predetermined threshold value, the controller adjusts an operation condition of the second pump to suspend or stop supplying the first fluid from the container to the flow cytometer, when the first fluid is the sheath fluid, and to suspend or stop extracting the first fluid from the flow cytometer and providing it to the container, when the first fluid is the waste fluid.

19. The system according to claim 16, wherein the control panel further comprises a first hidden button that is not labeled or marked and a second hidden button that is not labeled or marked, wherein the first hidden button is configured to calibrate the container in an empty state, and wherein the second hidden button is configured to calibrate the container in a full state.

20. The system according to claim 16, wherein the controller is configured to set or adjust the second pump to run at a pump speed higher than a pump speed at which the first pump runs, when the container contains a waste fluid flowing from the flow cytometer; and wherein the controller is configured to set or adjust the pressure of the fluidic system higher than a pressure of the flow cytometer if the float sensor does not indicate that the level of the liquid in the container is empty, or to stop the second pump if the float sensor indicates that the level of the liquid in the container is empty, when the container contains a sheath fluid flowing to the flow-cytometer-based system.

* * * * *

UNITED STATES PATENT AND TRADEMARK OFFICE
CERTIFICATE OF CORRECTION

PATENT NO. : 11,237,093 B2
APPLICATION NO. : 16/214674
DATED : February 1, 2022
INVENTOR(S) : Fan Xiong et al.

It is certified that error appears in the above-identified patent and that said Letters Patent is hereby corrected as shown below:

In the Claims

Column 18, Claim 2, Line 31:
"... first pump runs", should read --... first pump runs,--;

Column 18, Claim 5, Line 66:
"... flow-cytometer-based system; When", should read --... flow-cytometer-based system, when--;

Column 19, Claim 9, Lines 52 and 53:
"... indicated by the respective by the partially full", should read --... indicated by the respective partially full--;

Column 20, Claim 9, Line 8:
"stopping, by, the controller, the second pump...", should read --stopping, by the controller, the second pump...--;

Column 21, Claim 16, Line 9:
"a second pump connected to a second to a first end of...", should read --a second pump connected to a second end of...--;

Column 21, Claim 16, Line 24:
"container; wherein the controller...", should read --container, wherein the controller...--;

Column 21, Claim 16, Line 26:
"flow cytometer; wherein the controller...", should read --flow cytometer, wherein the controller...--;

Column 21, Claim 16, Line 47:
"full, and empty indicator light...", should read --full, an empty indicator light...--; and Signed and Sealed this
Nineteenth Day of April, 2022

*Katherine Kelly Vidal*
Katherine Kelly Vidal
*Director of the United States Patent and Trademark Office*

Column 22, Claim 17, Line 3:
"... to claim 16, Wherein...", should read --... to claim 16, wherein...--.